United States Patent [19]

Kawada

[11] Patent Number: 4,698,713
[45] Date of Patent: Oct. 6, 1987

[54] TAPE CASSETTE WITH LID LOCKING AND RELEASING MECHANISM

[75] Inventor: Hideaki Kawada, Kanagawa, Japan

[73] Assignee: Sony Corporation, Tokyo, Japan

[21] Appl. No.: 757,878

[22] Filed: Jul. 23, 1985

[30] Foreign Application Priority Data

Jul. 23, 1984 [JP] Japan ............................ 59-111224[U]

[51] Int. Cl.⁴ ............................................. G11B 23/02
[52] U.S. Cl. ..................................... 360/132; 242/198
[58] Field of Search ................. 360/132; 242/198, 199

[56] References Cited

U.S. PATENT DOCUMENTS 4,485,989 12/1984 Ogiro et al. ........................ 242/198
4,504,028 3/1985 Goto .............................. 360/132 X
4,556,153 12/1985 Takagi et al. ................... 242/199 X
4,564,120 1/1986 Pertzsch et al. ................ 242/198 X
4,589,609 5/1986 Oishi et al. ......................... 242/198

Primary Examiner—John H. Wolff
Attorney, Agent, or Firm—Lewis H. Eslinger; Alvin Sinderbrand

[57] ABSTRACT

A tape cassette comprising a tape, a casing for enclosing the tape therein and having an opening for drawing out the tape therefrom, a lid consisting of a front plate and two side plates projecting from the front plate and rotatably supported on the casing at the side plates so as to cover the opening and a lock lever arranged within the casing so as to be rotatably supported, the axis of rotation of the lock lever is parallel to the axis of rotation of the lid and is located between the front plate of the lid and the axis of the casing, the lid having either a projection or recess on the inside of the front plate of the lid, and the lock lever having a corresponding projection to be engaged with the projection or recess of the lid for locking the lid in a closed state during nonuse.

6 Claims, 6 Drawing Figures

TAPE CASSETTE WITH LID LOCKING AND RELEASING MECHANISM

BACKGROUND OF THE INVENTION

1. Field of the Invention

This invention relates to a tape cassette, and more particularly to a tape cassette which has a lid and a lock and lock-release mechanism thereof.

2. Description of the Prior Art

A conventional tape cassette such as BETA-type or VHS-type cassette has a tape, a casing consisting of upper and lower shells assembled to each other so as to enclose the tape, and a lid connected to the casing so as to protect the surface of magnetic layer of the tape from dust or dirt during nonuse. The lid has a front plate and to side plates elongated from the front plate form a body. On the other hand, recesses are formed on the outside surfaces of the side walls of the shells so as to receive the side plate of the lid. The lid is rotatably supported at its side plate on the side walls of the shells so as to be closed and locked during nonuse and to be released and unlocked when the cassette is used.

Such a conventional tape cassette is further provided with a tape threading area for drawing out the tape from the cassette casing at the front portion thereof and tape guides for restricting the tape path in the cassette during tape running.

Since the tape path in the cassette is restricted by the tape guides, and the tape threading area is relatively small in the conventional tape cassette, the space near the inside of the side plate of the lid is so efficiently utilized that a lock and lock-release mechanism of the lid is stored therein.

It is, however, desirable to remove the tape guides, since the tape guides directly influence the tape path according to its degree of verticality and causes demagnetization of the tape.

In order to increase the freeness of tape loading system of magnetic recording and/or reproducing apparatus (refered to hereafter as VTR), the threading area formed in the front side of the tape cassette is required to be as large as possible.

Recently, a small-sized tape cassette which is so called 8 mm video cassette has been introduced and is constructed so as to satisfied the condition as described above.

In the 8 mm video cassette, an engaging projection is formed on the inside surface of one of the side plates of the lid at a location behind the rotating axis of the lid. A lid lock lever, which has a corresponding projection to be engaged with the projection of the lid, is provided between the outside of the side wall of the casing and the inside of the side plate of the lid. The lid lock lever is rotatably and resiliently clockwise forced and when the lid is closed, the projection of the lid lock lever is engaged with the projection of the lid so as to lock the lid.

When the cassette is inserted into the VTR, a releasing lever provided within the VTR penetrates between the side plate of the lid and the side wall of the casing. Then the releasing lever hits the lid lock lever so as to rotate the lock lever anti-clockwise against the resilient enforcing power, after the projection of the lock lever is released from the projection of the side plate of the lid.

The lock mechanism of the above described configuration has a defect that the insertion stroke of the releasing lever is long.

A series of compatible cassettes are recently proposed, in which each of the cassettes includes a magnetic tape of the same width, and the tape reels having flanges of different diameter and casing of different dimensions corresponding to the length of the tape.

Namely, a short-length tape is provided into a small-sized cassette, a medium-length tape into a medium-sized cassette and a long-length tape into a large-sized cassette. In order to keep compatibility, the cassette of every size has the threading area formed in same shape at the center of the front portion of the casing.

In such a series of cassettes which are different from each other in the cassette size, however, since the releasing lever for the lid lock lever of the small-sized cassette comes is located under the reel flange of a large-sized cassette, it is difficult to adopt the construction as above described.

OBJECTS OF THE INVENTION

Therefore, it is an object of the invention to provide a tape cassette in which the lid lock mechanism is simply constructed so as to increase the space factor and the threading area of the cassette casing.

It is another object of the invention to provide a tape cassette which can be eliminate tape guide for guiding a running tape during use of the cassette.

It is another object of the invention to provide a tape cassette which has relatively large threading area.

It is still another object of the invention to provide a tape cassette which has compatibility in two or more different size.

It is a further object of the invention to provide a tape cassette which can be molded by molds in a simple construction.

It is a still further object of the invention to provide a tape cassette which can be manufactured in a low cost.

In accord with the invention, a tape cassette comprises a tape, a casing for enclosing the tape therein and having an opening for drawing out the tape therefrom, a lid consisting of a front plate and two side plates projecting from the front plate and rotatably supported on the casing at the side plates so as to cover the opening and a lock lever arranged within the casing so as to be rotatably supported, the axis of rotation of the lock lever is parallel to the axis of rotation of the lid, the lid having an uneven portion on the inside of the front plate of the lid, and the lock lever having a corresponding projection to be engaged with the uneven portion of the lid for locking the lid in a closed state during nonuse.

The above, and other objects, features and advantages of the present invention will be apparent from the following detailed description of an illustrative embodiment thereof which is to read in connection with the accompanying drawings.

DETAILED DESCRIPTION OF THE PREFERRED EMBODIMENTS

Figure 1:
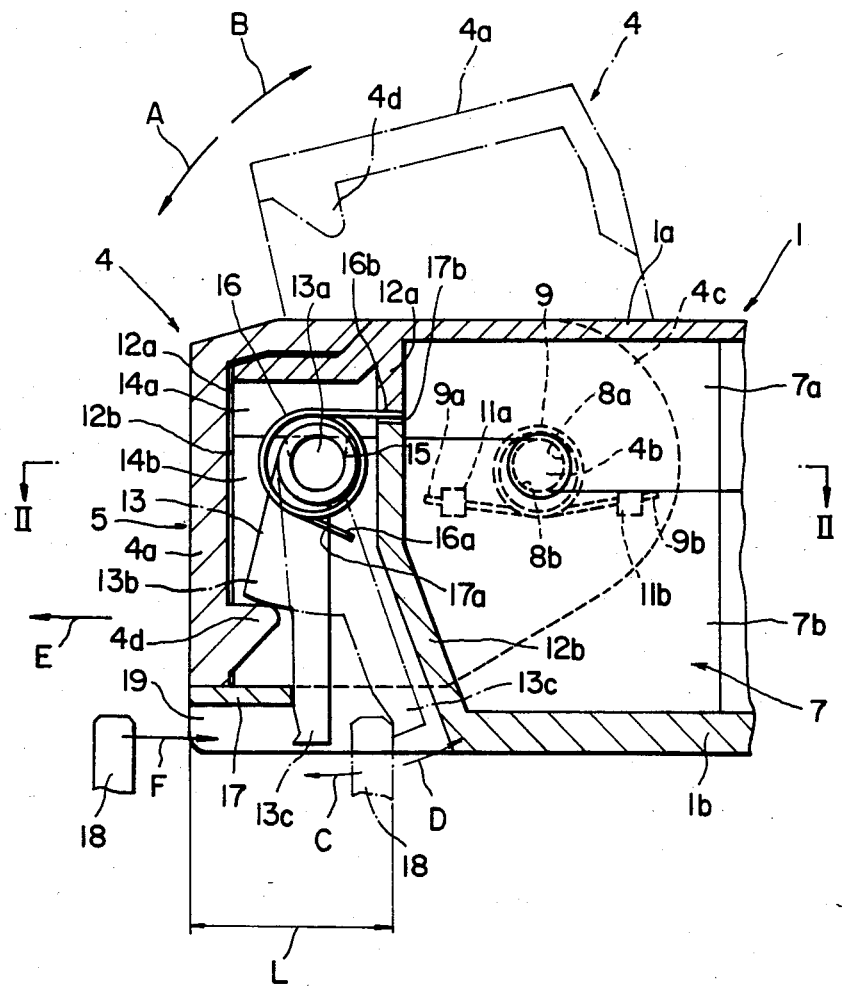
FIG. 1 is a cross sectional side view showing a portion of a tape cassette according to an embodiment of the invention.
Figure 2:
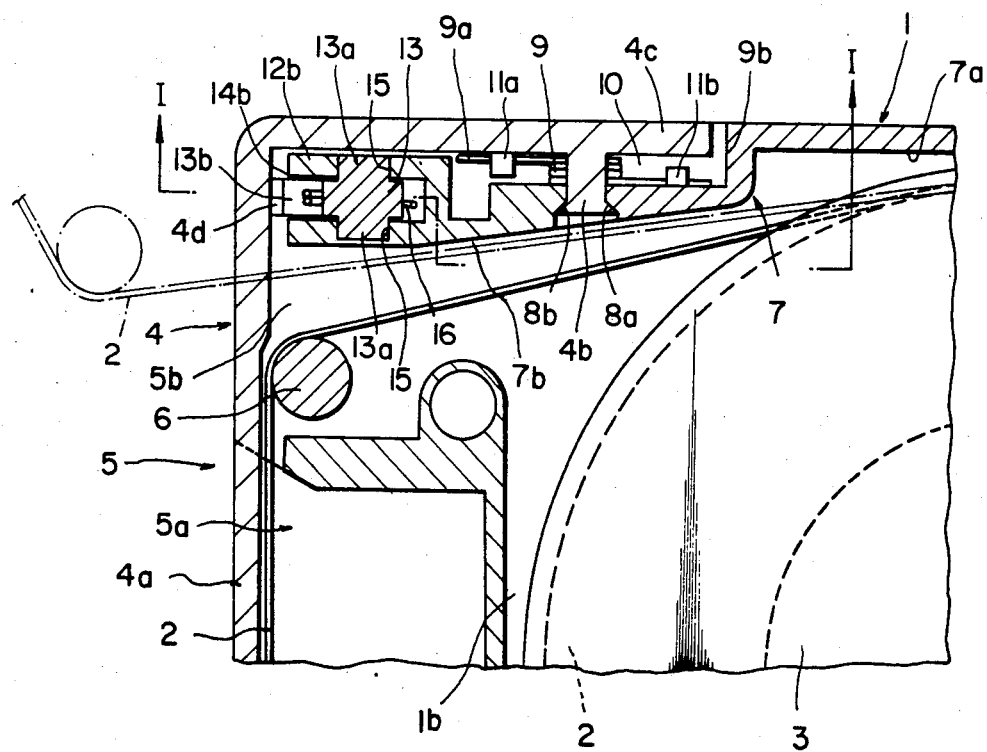
FIG. 2 is a partially eliminated cross sectional front view showing a tape cassette of FIG. 1.
Figure 3:
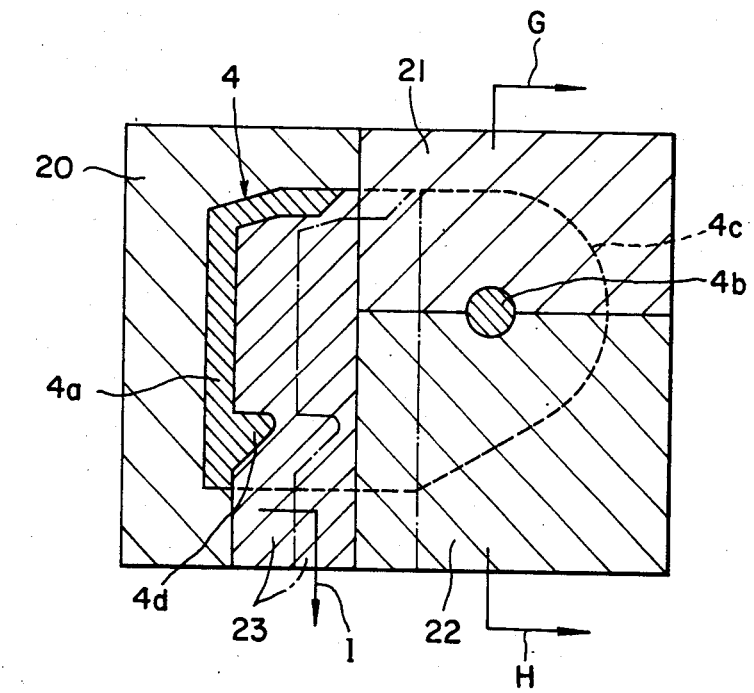
FIG. 3 is a cross sectional side view showing a mold construction for molding a lid of the tape cassette shown in FIGS. 1 and 2.

Referring to the drawings, especially to FIGS. 1 to 3, a tape cassette according to an embodiment of the invention will be now described.

In FIGS. 1 and 2, a tape cassette has a cassette casing 1 comprised of a cover half 1a and a base half 1b for enclosing a magnetic tape 2 which is wound around a pair of tape reels 3 and a lid 4 for closing a front opening 5 including a tape threading area 5a and tape passing apertures 5b at both sides of the tape threading area 5a of the cassette casing 1 with its front plate 4a. The casing 1 is also provided with a pair of tape guide pins 6 for guiding the tape 2 during nonuse.

The casing 1 has left and right side walls 7 each of which is constructed from half side walls 7a and 7b of the cover half 1a and the base half 1b. A lid 4 is rotatably supported by both of left and right side walls 7 of a cassette casing 1 at a pair of supporting pins 4b which are provided in a body on the inside surface of left and right side plates 4c of the lid 4, respectively and rotatably caught from above and below between recesses 8a and 8b which are formed on upper and lower dividing surfaces of the half side walls 7a and 7b.

The lid 4 is rotationally forced to the direction shown by an arrow A by a return spring 9 so as to normally close the opening 5 with the front plate 4a as shown by a full line. When the lid 4 is rotated to the direction shown by an arrow B against the power of the return spring 9 as shown by a one dotted chain line, the opening 5 is open. The return spring 9 consists of a twisted coil spring and is wound around one of the supporting pins 4b within a gap 10 formed between one of the side plates 4c of the lid 4 and one of the side walls 7 of the cassette casing 1. Both ends 9a and 9b of the return spring 9 is engaged with a pair of engaging portions 11a and 11b formed in a body on the side plate 4c of the lid 4 and the half side wall 7b of the base half 1b, respectively so that the lid 4 is forced to the direction shown by the arrow A.

Lock lever attaching walls 12a and 12b are provided in a body on the front end of the half side walls 7a and 7b, respectively. A lock lever 13 is rotatably supported at its supporting pin 13a within slits 14a and 14b which are formed in the lock lever attaching walls 12a and 12b respectively and are elongated up and down.

The supporting pin 13a is formed in a body with the lock lever 13 at its upper end and inserted from above into a pair of supporting recesses 15 which are provided on the upper end of the lock lever attaching wall 12b of the half side wall 7b and caught by the lower end of the lock lever attaching wall 12a of the half side wall 7a. The supporting pin 13a is arranged parallel to the supporting pins 4b of the casing 4 so that the rotating axis of the lock lever 13 is parallel to the rotating axis of the lid 4.

The lock lever 13 is rotationally forced to the direction shown by an arrow C by a return spring 16 so as to lock the lid 4 in a closed state, an a projection 13b of the lock lever 13 is engaged with the upper portion of a corresponding projection 4d formed in a body on the back surface of the front plate 4a of the lid 4. At that time, the lower end 13c of the lock lever 13 is in contact with the front end 17 of the base half 1b from the back. The return spring 16 consists of a twisted coil spring and is wound around the supporting pin 13a. Both ends 16a and 16b of the return spring 16 are engaged with a pair of engaging portions 17a and 17b formed in a body with the lock lever 13 and the lock lever attaching wall 12a, respectively, so that the lock lever 13 is forced to the direction shown by the arrow C.

When the tape cassette is inserted into a cassette holder (not shown) of a VTR to the direction shown by an arrow E, a releasing projection 18 which is provided on a base plate of the cassette holder for releasing the lid 4 from lock lever 13 is inserted along the direction shown by an arrow F into a slot 19 which is formed at the lower portion of the front end 17 of the base half 1b, so that the lock lever 13 is rotated to the direction shown by an arrow D against the power of the return spring 16 so as to release the lid 4 from its lock state as shown by another one dotted chain line.

On the other hand, when the tape cassette is ejected from the VTR, the pressing force of the lower end 13c of the lock lever 13 against the releasing projection 18 is removed so that the lock lever 13 returns to the original position by the force of the return spring 16 and the projection 4d of the lid 4 gets over the projection 13b of the lock lever 13 so as to be locked.

According to the embodiment of this invention, since the lock lever 13 is arranged between the front plate 4a and the supporting pin 4b of the lid 4, it is possible to shorten the stroke L to insert the projection 18 into the slit 19 along the direction shown by the arrow F for releasing the lock lever 13 from its lock state.

A mold construction for injection molding the lid 4 of synthetic resin is, however, complicated as shown in FIG. 3, since the projection 4d is formed in a body on the back surface of the front plate 4a of the lid 4. The front surface and the supporing pin 4b of the lid 4 are formed by molds 20, 21, 22 which are separated into front and back and into up and down, and the projection 4d on the front plate 4a of the lid 4 is formed by mold 23 which is separated from the mold 20 into front and back. Therefore, when three of the back molds 21, 22 and 23 are disassembled in order to take the lid 4 out, after molding by the four molds 20, 21, 22 and 23 which are assembled as shown by a full line, it is necessary to disassemble the molds 21 and 22 to the direction shown by arrows G and H first and then disassemble the mold 23 to the direction shown by an arrow I.

Figure 4:
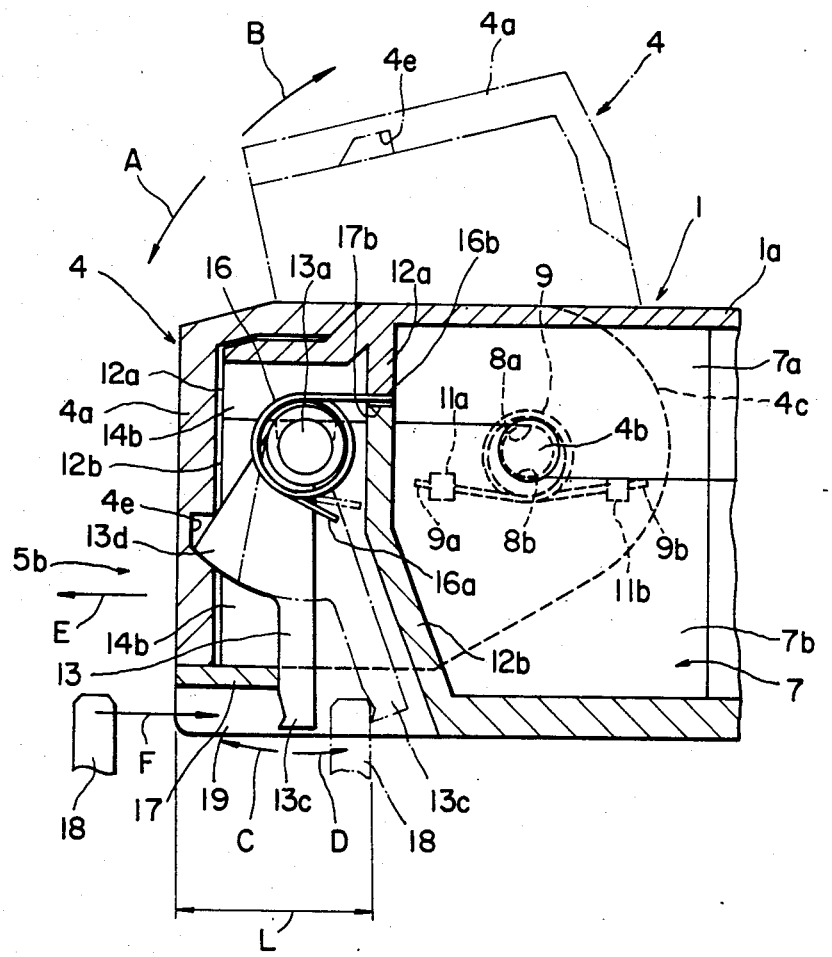
FIG. 4 is a cross sectional side view showing a portion of a tape cassette according to another embodiment of the invention.
Figure 5:
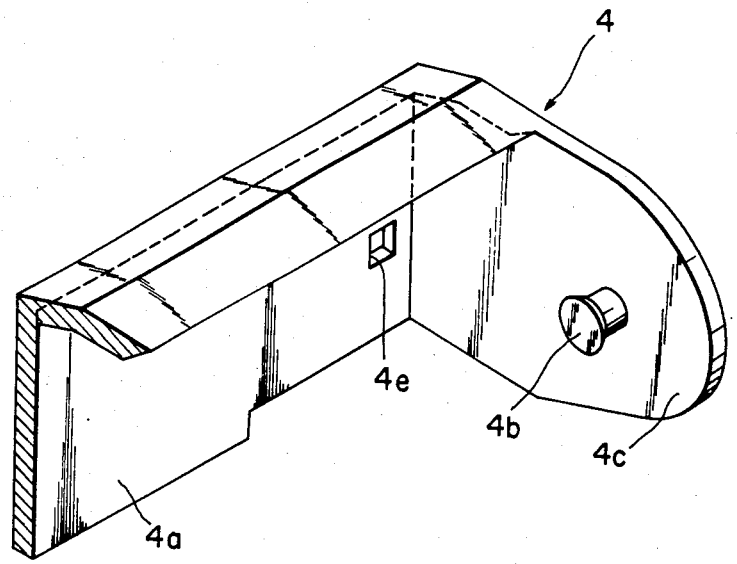
FIG. 5 is a perspective view showing a main portion of a lid of the tape cassette shown in FIG. 3.

For providing a simple mold construction, as shown in FIGS. 4 and 5 according to another embodiment of this invention, a recess 4e is provided on the back surface of the front plate 4b of the lid 4. A larger projection 13d formed in a body with the lock lever 13 is engaged with the recess 4e of the lid 4 so as to lock the lid 4 in a closed state as shown by a full line in FIG. 4.

Figure 6:
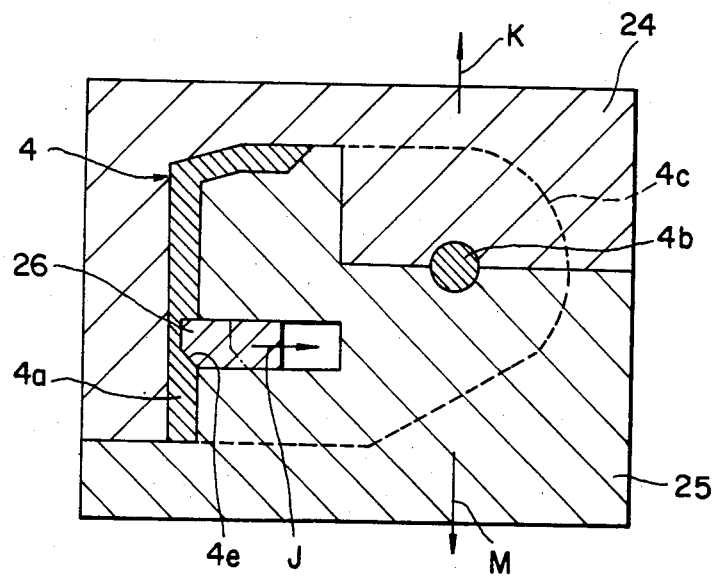
FIG. 6 is a cross sectional side view showing a mold construction for molding a lid of the tape cassette shown in FIG. 4.

As shown in FIG. 6, a mold construction for injection molding the lid 4 of this embodiment has molds 24 and 25 which are separated up and down around the supporting pins 4b and a sliding core 26 provided within the mold 25 and for molding the recess 4e of the lid 4. When two of the molds 24 and 25 are disassembled in order to take the lid 4 out after molding, it is enough to slide the sliding core 26 to the direction shown by an arrow J before disassembly of the molds 24 and 25 in the directions shown by arrows K and M.

The present invention is not limited to a tape cassette for use with a video tape recorder, but can be applied to any tape cassette for use with various apparatus for recording and/or reproducing various information in various methods for recording or reproducing.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims.

What is claimed is:

1. A tape cassette for use with a cassette holder having a releasing element and comprising a tape, a casing for enclosing said tape therein and having a base and an opening for drawing out said tape cassette, a lid consisting of a front plate and a pair of side plates projecting from said front plate and rotatably supported on said casing at said side plates so as to cover said opening and a lock lever arranged within said casing so as to be rotatably supported and located between said front plate and the axis of rotation of said lid, said lock lever having a lower end extending downwardly relative to said base from the axis of rotation of said lock lever for engagement with said releasing element for releasing said lid from a closed state, the axis of rotation of said lock lever being parallel to the axis of rotation of said lid, with the two axes of rotation being at least at the same height from said bottom wall of said casing, said lid having an uneven portion formed on the inside of said front plate of said lid, and said lock lever having a projection to be engaged with said uneven portion on said lid for locking said lid in a closed state.

2. A tape cassette according to claim 1, wherein said uneven portion formed on the inside of said front plate of said lid includes a projection for engaging said projection of said lock lever.

3. A tape cassette according to claim 1, wherein said uneven portion formed on the inside of said front plate of said lid includes a recess in the inside surface of said front plate for engaging said projection of said lock lever.

4. A tape cassette according to claim 1, wherein said tape is a magnetic recording tape.

5. A tape cassette for use with a cassette holder having a releasing element and comprising a tape, a casing for enclosing said tape therein and having an opening for drawing out said tape therefrom, a lid consisting of a front plate and a pair of side plates projecting from said front plate and rotatably supported on said casing at said side plates so as to cover said opening and a lock lever arranged within said casing so as to be rotatably supported, said lock lever having a lower end extending downwardly relative to said base from the axis of rotation of said lock lever for engagement with said releasing element for releasing said lid from a closed state, the axis of rotation of said lock lever being parallel to the axis of rotation of said lid and being located between said front plate of said lid and the axis of rotation of said lid, said lid having a recess formed on the inside surface of said lid, and said lock lever having a projection for cooperating with said recess and locking said lid in a closed state.

6. A tape cassette according to claim 5, in which said recess is rectangular in shape and has a selected inner surface being slanted relative to said front plate and said projection on said lock lever is correspondingly slanted.

* * * * *